US008149083B2

United States Patent
Suzuki et al.

(10) Patent No.: US 8,149,083 B2
(45) Date of Patent: Apr. 3, 2012

(54) VEHICLE DOOR OPENING/CLOSING APPARATUS AND METHOD FOR CONTROLLING A VEHICLE DOOR TO OPEN/CLOSE

(75) Inventors: Shintaro Suzuki, Kasugai (JP); Chiaki Honma, Obu (JP); Junji Yamaguchi, Toyota (JP); Takeshi Nishikibe, Anjo (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 1007 days.

(21) Appl. No.: 11/598,773

(22) Filed: Nov. 14, 2006

(65) Prior Publication Data
US 2007/0115096 A1 May 24, 2007

(30) Foreign Application Priority Data
Nov. 16, 2005 (JP) ................. 2005-331562

(51) Int. Cl.
G05B 23/02 (2006.01)
(52) U.S. Cl. ........................................ 340/3.1
(58) Field of Classification Search .............. 340/3.1, 340/10.1, 5.2, 5.72, 5.6
See application file for complete search history.

(56) References Cited

U.S. PATENT DOCUMENTS

| 5,228,239 | A | * | 7/1993 | Heo | 49/280 |
| 6,034,617 | A | * | 3/2000 | Luebke et al. | 340/5.62 |
| 6,359,348 | B1 | * | 3/2002 | King | 307/10.1 |
| 6,670,883 | B1 | * | 12/2003 | Asakura et al. | 340/5.61 |

FOREIGN PATENT DOCUMENTS
JP   2004-316231   11/2004

* cited by examiner

Primary Examiner — Vernal Brown
(74) Attorney, Agent, or Firm — Buchanan Ingersoll & Rooney PC

(57) ABSTRACT

A vehicle door opening/closing apparatus includes a mobile apparatus carried by a user, a recognizing apparatus for recognizing the mobile apparatus within a predetermined area relative to a vehicle, a commanding apparatus provided at the mobile apparatus for commanding an opening/closing operation of a door on the basis of an intention of the user and a controlling apparatus for controlling the door on the basis of a recognition of the recognizing apparatus and the opening/closing operation command of the commanding apparatus. The controlling apparatus opens the door when the recognizing apparatus recognizes the mobile apparatus within the predetermined area and in a situation where the commanding apparatus has commanded to open the door. The controlling apparatus closes the door when the recognizing apparatus recognizes that the mobile apparatus is out of the predetermined area and in a situation where the commanding apparatus has commanded to close the door.

14 Claims, 5 Drawing Sheets

VEHICLE DOOR OPENING/CLOSING APPARATUS AND METHOD FOR CONTROLLING A VEHICLE DOOR TO OPEN/CLOSE

CROSS REFERENCE TO RELATED APPLICATIONS

This application is based on and claims priority under 35 U.S.C. §119 to Japanese Patent Application 2005-331562, filed on Nov. 16, 2005, the entire content of which is incorporated herein by reference.

FIELD OF THE INVENTION

This invention generally relates to a vehicle door opening/closing apparatus and a method for controlling a vehicle door to open/close.

BACKGROUND

A wireless remote control system is known as a vehicle door opening/closing apparatus for opening/closing a vehicle door in cooperation with a mobile apparatus carried by a vehicle user. The wireless remote control system locks/unlocks a door lock and electrically opens/closes a power slide door when a user, who is present near a vehicle, operates an operating portion provided at a mobile apparatus. At this time, it is unnecessary for the user to touch the vehicle. Further, a locking system (entry system), in which a door lock of a vehicle door is automatically controlled to lock/unlock without an operation of a mobile apparatus by a user, is also known. The locking system controls the door lock of the vehicle door to lock/unlock by detecting a user, who has approached the vehicle or has gotten out of the vehicle, and by recognizing an intention of the user who wants to lock or unlock the door lock of the vehicle door on the basis of a command (operation) from the user. Here, the command of the user is, for example, a touch to a door handle. As an application of the entry system, an apparatus for unlocking a door lock and for opening a power slide door, or the like, is also suggested.

Such a remote control system and an entry system are convenient. However, in the situation of the remote control system, for example, a user, carrying goods in both hands, who has approached the vehicle, cannot operate the operating portion of the mobile apparatus. Similarly, in the situation of the entry system, there can be a situation where the user cannot give the command to unlock the door lock (and open the door) and the door lock cannot be automatically unlocked (and the door cannot be automatically opened). For overcoming the drawback of the entry system described above, a method for unlocking a door lock (and for opening a door) on the basis of approach of a user regardless of presence/absence of a command from the user is suggested. However, by this method, even when the user approaches the vehicle without an intention to unlock the door lock and to open the door, the door is automatically unlocked and opened.

JP2004-316231A (Patent document 1) suggests an entry system (automatic door opener system) for solving the drawback described above. In this entry system, a door is opened in a situation where electric waves emitted from a mobile apparatus (entry key) are received by a vehicle and a gentle hit or tap is given to a predetermined portion of the vehicle. Here, the predetermined portion is, for example, a side sill provided at a lower end of a slide door of the vehicle. The user can give the gentle hit or tap to the side sill, for example, by using a controlled kick with his/her foot.

The entry system described in Patent document 1 is useful as an entry system, in which the door can be opened without an operation of the entry key even when both hands of the user are unavailable. However, there can be a situation where the user, carrying goods in both hands, loses balance in his/her posture when he/she gently hits or taps the vehicle with another part of his/her body such as his/her foot. Further, there can be a situation where the user cannot give accurate and necessary strength of the gentle hits or taps. Further, there can be a situation where gentle hitting or tapping to the vehicle causes the user to smear a part of his/her body, clothing, and shoe if it rains, a ground is wet, and the vehicle is dirty. On the other hand, another method is possible in which an opening condition of a door of an entry system can be preliminarily set in a vehicle, and only in a situation where special setting has been applied, the door can be opened only on the basis of detection of approach of a user. However, considering a situation where the user approaches the vehicle from a distant place and opens the vehicle door to get into the vehicle, generally, circumstances, in which the user carrying goods in both hands, arise when the user stays away from the vehicle. Accordingly, the method, in which the opening condition of the door is preliminary set in the vehicle, is not necessarily convenient.

A need thus exists for a vehicle door opening/closing apparatus and a method for controlling a vehicle door to open/close, which enables an automatically opening/closing of a vehicle door on the basis of an intention of a user without an operation of a control portion provided in a vehicle or without an operation of a control portion of a mobile apparatus for remote control each time the user intends to open/close the vehicle door. The present invention has been made in view of the above circumstances and provides such a vehicle door opening/closing apparatus and a method for controlling a vehicle door to open/close.

SUMMARY OF THE INVENTION

According to an aspect of the present invention, a vehicle door opening/closing apparatus includes a mobile apparatus carried by a vehicle user, a recognizing means for recognizing a presence of the mobile apparatus within a predetermined area relative to a vehicle, a commanding means provided at the mobile apparatus for commanding an opening/closing operation of a vehicle door on the basis of an intention of the vehicle user even in a situation where the mobile apparatus is out of the predetermined area of the recognizing means and a controlling means for controlling the vehicle door to open/close on the basis of a recognition of the recognizing means and the open/close operation command of the commanding means. The controlling means operates the vehicle door to open at the time when the recognizing means recognizes that the mobile apparatus is within the predetermined area and in a situation where the commanding means has commanded to operate the vehicle door to open on the basis of the intention of the vehicle user. The controlling means operates the vehicle door to close at the time when the recognizing means recognizes that the mobile apparatus is out of the predetermined area and in a situation where the commanding means has commanded to operate the vehicle door to close on the basis of the intention of the vehicle user.

According to a further aspect of the present invention, a method for controlling a vehicle door to open/close in cooperation with a mobile apparatus carried by a vehicle user includes a first step for preliminarily commanding the mobile apparatus to operate the vehicle door to open/close on the basis of an intention of the vehicle user and a second step for automatically operating the vehicle door to open at the time when the recognizing means recognizes a presence of the mobile apparatus within a predetermined area relative to a vehicle and in a situation where the mobile apparatus has been preliminarily commanded to operate the vehicle door to open in the first step, and for automatically operating the vehicle door to close at the time when the recognizing means recognizes a non-presence of the mobile apparatus within the predetermined area and in a situation where the mobile apparatus has been preliminarily commanded to operate the vehicle door to close in the first step.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
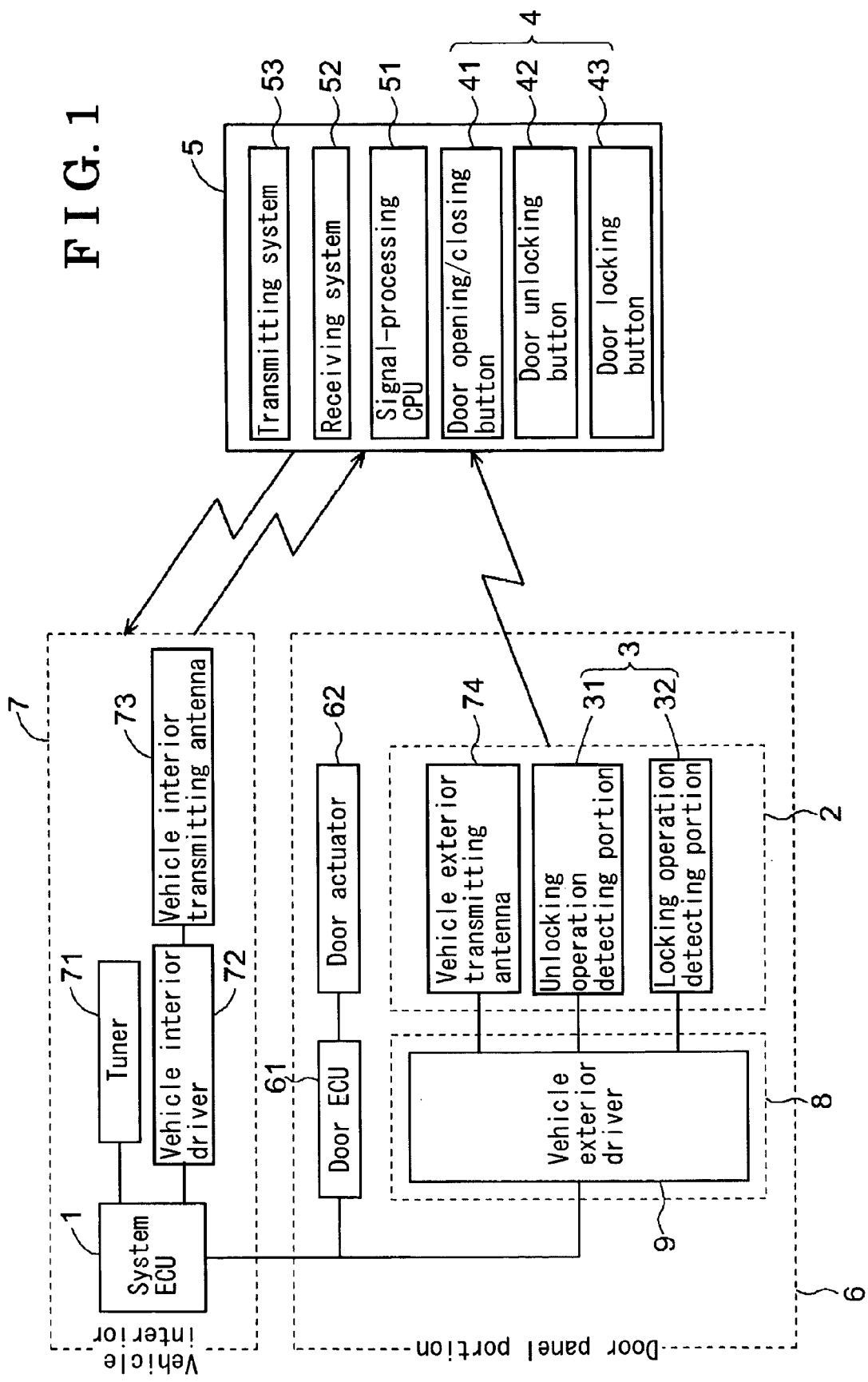
FIG. 1 represents a block diagram typically illustrating a configuration of a vehicle door opening/closing apparatus according to an embodiment of the present invention.

An embodiment of the present invention will be explained with reference to the draw figures. In the embodiment of the present invention, a vehicle door opening/closing apparatus and a method for controlling a vehicle door to open/close are applied to an entry system. FIG. 1 represents a block diagram typically illustrating a configuration of the vehicle door opening/closing apparatus according to the embodiment of the present invention. The vehicle door opening/closing apparatus according to the embodiment of the present invention includes, as illustrated in the figure, a mobile apparatus 5 carried by a vehicle user (for example, a driver. Hereinafter, simply referred to as a user in appropriate situations), a system electronic control unit (ECU) 1 and a door ECU 61 provided at a vehicle. The mobile apparatus 5 is so called a remote controller or a transmitter. The mobile apparatus 5 includes a commanding means 4 for giving a command to open/close the vehicle door (opening/closing operation command) according to an intention of the user as described below. The mobile apparatus 5 further includes a signal-processing central processing unit (CPU) 51, a receiving system 52, a transmitting system 53, or the like. The mobile apparatus 5 can communicate with the system ECU 1 provided at the vehicle within a predetermined area described below. The system ECU 1 communicates with the mobile apparatus 5 through a tuner 71, a vehicle interior driver 72 provided in a vehicle compartment 7, a vehicle interior transmitting antenna 73 provided in the vehicle compartment 7, a vehicle exterior transmitting antenna 74 provided outside the vehicle compartment 7 and a vehicle exterior driver 9 provided outside the vehicle compartment 7, or the like.

A communication between the mobile apparatus 5 and the system ECU 1 is possible if the mobile apparatus 5 is within the predetermined area relative to the vehicle. The system ECU 1 recognizes that the mobile apparatus 5 is present within the predetermined area if the communication is established. Then, for example, in a situation where the communication is established from a state where the communication is not established, the system ECU 1 recognizes that the mobile apparatus 5 has moved from outside the predetermined area into the predetermined area, in other words, the user, who is carrying the mobile apparatus 5, has approached the vehicle. Inversely, in a situation where the communication is disrupted from a state where the communication is established, the system ECU 1 recognizes that the mobile apparatus 5 has moved from inside the predetermined area to outside the predetermined area, in other words, the user, who is carrying the mobile apparatus 5, has moved away from the vehicle. The system ECU 1, which functions as described above, serves as a recognizing means according to the embodiment of the present invention. The door ECU 61 drives a door actuator 62 to control the vehicle door to open/close. The door ECU 61, which performs an opening/closing operation of the vehicle door, serves as a controlling means according to the embodiment of the present invention.

Figure 2:
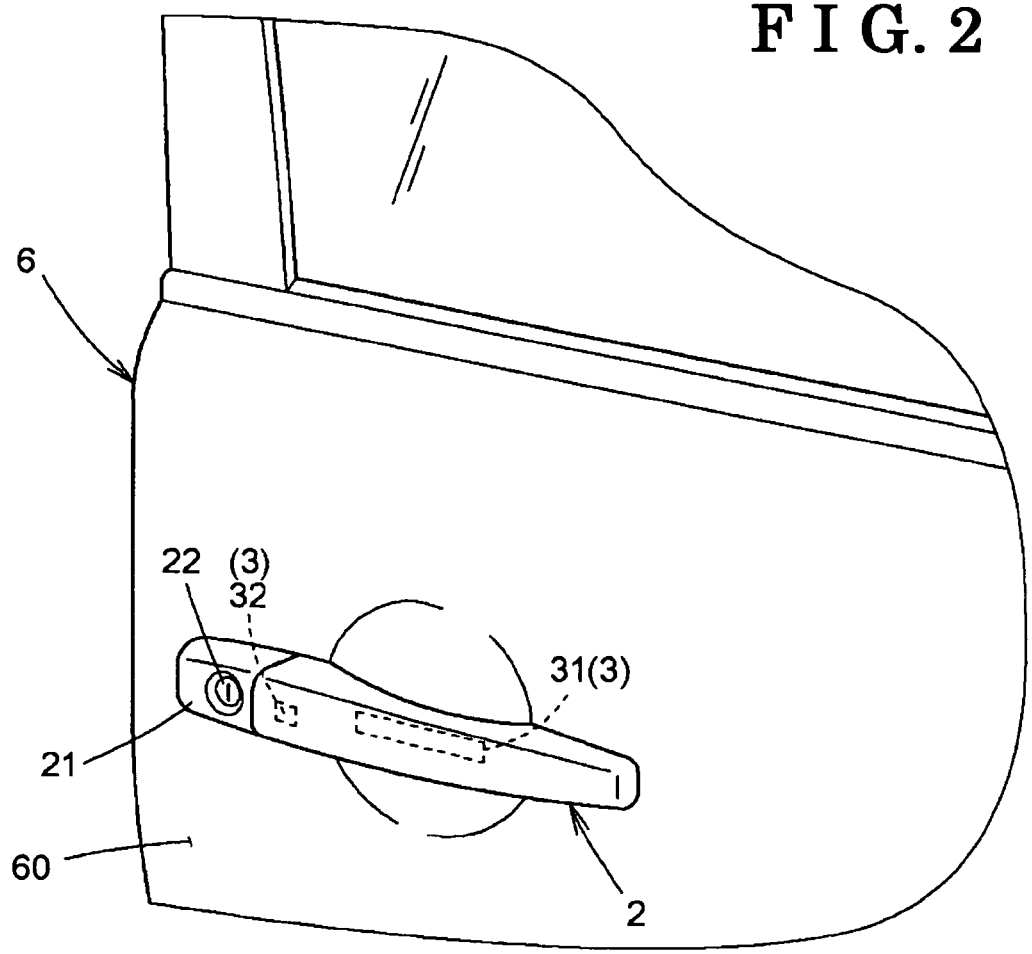
FIG. 2 represents a perspective view illustrating an example of a vehicle door.
Figure 3:
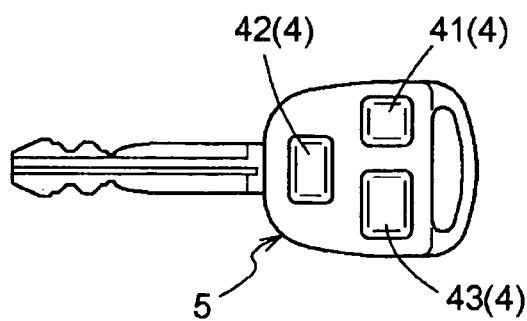
FIG. 3 represents a diagram illustrating an appearance of an example of a mobile apparatus.

FIG. 2 represents a perspective view illustrating an example of the vehicle door. FIG. 3 represents a diagram illustrating an appearance of an example of the mobile apparatus. A basic system configuration of the entry system will be explained with reference to FIGS. 1 to 3.

As illustrated in FIG. 1, the mobile apparatus 5 includes the receiving system 52 configured from an antenna and a tuner, or the like, for receiving electric waves from the vehicle, the transmitting system 53 configured from an antenna and a modulation circuit, or the like, for transmitting electric waves to the vehicle and the signal-processing CPU 51 for performing signal processing such as controls of transmission/reception, judgment of a received signal, generation of a transmission signal, or the like. These are mainly functions for a transmitter. The mobile apparatus 5 further includes a button (remote control portion) utilized by the user for directly and remotely controlling a door lock (vehicle door locking device) to lock/unlock and a door 6 to open/close from a limited distant position from the vehicle. In the present example, the mobile apparatus 5 includes a door locking button 43 for locking the door lock, a door unlocking button 42 for unlocking the door lock and a door opening/closing button 41 for opening/closing the door 6. These are mainly functions for a remote controller. The user can remotely control the door lock to lock/unlock and the door 6 to open/close by directly operating the buttons each time as necessity arises.

In the vehicle compartment 7, the system ECU 1 for performing general controls of the entry system, the tuner 71 for receiving the transmission signal from the mobile apparatus 5, the vehicle interior transmitting antenna 73 for transmitting a signal to the mobile apparatus 5 and the vehicle interior driver 72 for performing signal processing such as modulation and amplification, or the like, on a signal transmitted through the vehicle interior transmitting antenna 73 are provided.

As illustrated in FIG. 2, a door handle 2 is provided at a door panel 60 of the door 6 as an operating portion for operating the door 6 to open/close. The door handle 2 is held by a handle frame 8 (not illustrated in FIG. 2) provided inside the door panel 60 of the door 6. In other words, the door handle 2 is held by the handle frame 8 in a way that the door panel 60 is sandwiched by the door handle 2 and the door handle frame 8. A handle cap 21 is held by the handle frame 8. A key cylinder 22, which is utilized in a situation where the door lock of the vehicle door 6 is unlocked or locked by a manual operation of a mechanical key, is provided at the handle cap.

As illustrated in FIG. 1, the door handle 3 includes the vehicle exterior transmitting antenna 74 for transmitting a signal to the mobile apparatus 5 and an operation detecting portion 3 for detecting an operation of the door handle 2 by the user. The vehicle exterior transmitting antenna 74 is provided at a middle portion of the door handle 2. In the embodiment, the vehicle exterior transmitting antenna 74 is configured from a loop antenna made of ferrite. However, the vehicle exterior transmitting antenna 74 is not limited to this and anything can be employed if the vehicle exterior transmitting antenna 74 can correspond to a frequency band in use and can be provided in the door handle 2.

The operation detecting portion 3 includes an unlocking operation detecting portion 31 for detecting a command (or intention) from the user to unlock and a locking operation detecting portion 32 for detecting a command (or intention) from the user to lock. As illustrated in FIG. 2, the unlocking operation detecting portion 31 is provided at a back side of the door handle 2, in other words, at a side which faces the door panel 60. In other words, the unlocking operation detecting portion 31 is provided at the back side of the door handle 2 so that a contact of a hand of the user who puts a hand on the door handle 2 can be easily detected when the user intends to open the door 6. The locking operation detecting portion 32 is provided at a front side (outside) of the door handle 2, in other words, at a side which does not face the door panel 60. In other words, the locking operation detecting portion 32 is provided so as to face toward the outside of the door handle 2 so that an intention to lock can be recognized when the user gets out of the vehicle, closes the vehicle door 6, and pushes or contacts the outside of the door handle 2 with his/her finger, or the like.

The vehicle exterior driver 9 for performing transmission/reception of a signal to/from each portion provided at the door handle 2 is provided at an inside of the handle frame 8. The vehicle exterior driver 8 is connected to each portion in the door handle 2 and the system ECU 1 in the vehicle compartment 7 through wire harnesses (not illustrated). Further, a solenoid for actuating the lock mechanism of the door lock of the door 6 to lock/unlock, a door actuator 62 for opening/closing the door 6, such as a motor, and the door ECU 61 for controlling the door actuator 62 are provided in the door panel 60. The door ECU 61 and the vehicle exterior driver 9 are controlled by the system ECU 1.

[Unlocking and opening operation control] An example of an opening operation and a closing operation will be explained according to the embodiment of the present invention with reference to flowcharts illustrated in FIGS. 4 to 6. In this example, the door ECU 61 as a controlling means controls, in addition to opening/closing the door 6, locking/unlocking the door lock. However, it does not limit the scope of the invention. Another controlling means for controlling the door lock of the door 6 to lock/unlock can be separately provided, and the door ECU 61 can control only the door 6 to open/close. At first, "unlocking and opening operation" will be explained with reference to a flowchart illustrated in FIG. 4.

Figure 4:
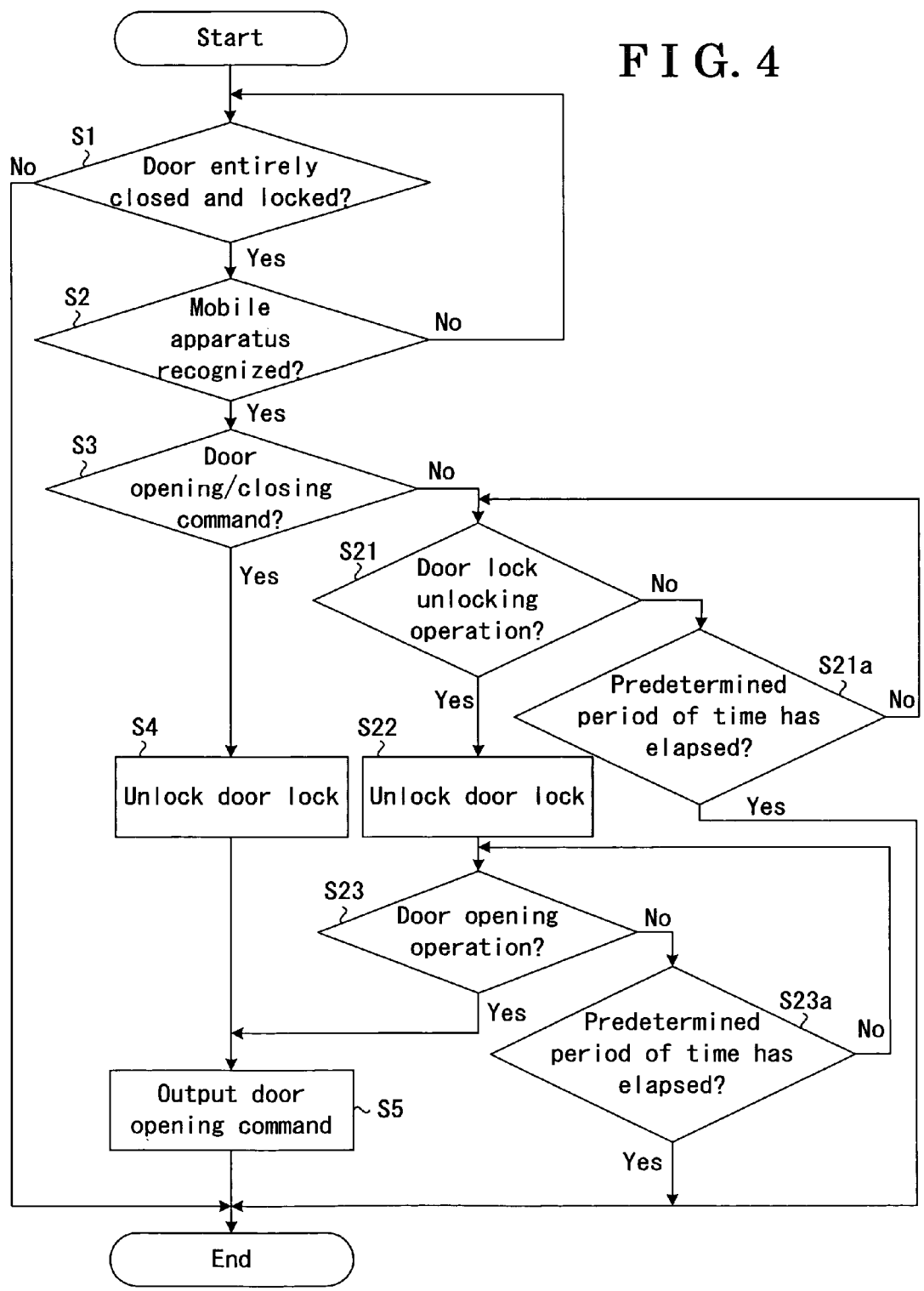
FIG. 4 represents a flowchart illustrating an example (unlocking and opening operation) of the present invention.

In the flowchart illustrated in FIG. 4, a series of processes indicated by codes indicated by #1 to #5 illustrates a representative flow of the unlocking and opening operation according to the embodiment of the present invention. A series of processes which are branched from the process indicated by the code #3 and which proceeds to processes indicated by codes #21 to #23 and #23a illustrates a representative flow of a conventional unlocking and opening control. Here, "door opening/closing command" indicated by the code #3 is "a command to automatically operate the door lock of the door to unlock and operate the door to open in a situation where the mobile apparatus 5 has entered a predetermined area relative to the vehicle" in a situation of the unlocking and opening operation control. In other words, the "door opening/closing command" indicated by the code #3 is an intention (will) of the user who wants the door lock to be automatically unlocked and the door to be automatically opened in a situation where the user has come close to the vehicle. The user can preliminarily give this command to the mobile apparatus 5 as follows even in a situation where the mobile apparatus 5 is out of the predetermined area.

As illustrated in FIG. 3, the mobile apparatus 5 includes the door opening/closing button 41, the door unlocking button 42 and the door locking button 43, which serve as the remote control portion 4. As described above, the user normally utilizes these buttons to remotely control the door 6. Here, the remote control portion 4 is utilized as the commanding means according to the embodiment of the present invention. In a situation where the user wants the door lock to be automatically unlocked and the door to be automatically opened when the user comes close to the vehicle, the user pushes the door opening/closing button 41 continuously in a predetermined period of time. In other words, the user continuously pushes the door opening/closing button 41. By this, the signal-processing CPU 51 of the mobile apparatus 5 receives an intention of the user who "wants the door lock to be automatically unlocked and the door to be automatically opened when the user comes close to the vehicle" as a command. This command will be referred to as a "door opening/closing command". This command (opening command) is recorded in a primary storage means (memory or register) installed in the signal-processing CPU 51. This step, at which the user commands the mobile apparatus 5 to reserve the opening/closing operation (opening operation) of the door 6 on the basis of the intention of the user, corresponds to a first step of a means for controlling a vehicle door to open/close according to the embodiment of the present invention.

A method for setting the command is not limited to the method described above. For example it is possible to set the opening operation command in a situation where the door opening/closing button 41 and the door unlocking button 42 are simultaneously pushed. Of course, another operation method, for example, in which two or more buttons are simultaneously continuously pushed for a predetermined period of time, can be employed. Further, the mobile apparatus 5 can include a commanding means different from the existing remote control portion 4.

The unlocking and opening operation control will be explained again with reference to the flowchart illustrated in FIG. 4. As the unlocking and opening operation control is started, the system ECU 1 checks a state of the door 6. In other words, the system ECU 1 checks that the door lock of the door 6 is locked and the door 6 is entirely closed (#1). In the meantime, in a situation where only an opening control is performed and a locking/unlocking control is not performed, it is possible that the system ECU 1 checks only that the door 6 is entirely closed. Further, even in a situation where the unlocking control is performed with the opening control, a locking state can be removed from the condition. If the unlocking control is further performed in a state where the door lock of the door 6 is unlocked, the unlocked state will not change, which does not induce substantial problems.

Next, the system ECU 1 outputs a request signal to the vehicle exterior driver 9 provided at the door panel 60 in order to recognize the mobile apparatus 5, which is an electronic key registered for the vehicle of the user. A transmission amplifier of the vehicle exterior driver 9 modulates and amplifies the request signal. The vehicle exterior transmitting antenna 74 provided at the door handle 2 transmits electric waves outside the vehicle. Here, in a situation where the mobile apparatus 5 comes close to the vehicle and enters so called a communication area (predetermined area), the transmitted electric waves are received by the receiving system 52 of the mobile apparatus 5. The signal-processing CPU 51 of the mobile apparatus 5 processes the received signal. The transmitting system 53 of the mobile apparatus 5 transmits return information such as characteristics of the received signal and a registration code. Here, the characteristics mean, for example in a situation where the vehicle has plural doors, items of information, which indicates a source of the received signal, in other words, information about which vehicle exterior antenna 74 transmits the received signal, or the like. The tuner 71 of the vehicle receives the electric waves transmitted from the mobile apparatus 5. The system ECU 1 checks the characteristics and the registration code included in the return information. Thus, the system ECU 1 recognizes that the mobile apparatus 5 as the electronic key registered for the vehicle is present within the predetermined area (#2).

The return information transmitted by the mobile apparatus 5 includes the "door opening/closing command (opening command)" set by the user. The system ECU 1 recognizes the "door opening/closing command" by processes similar to that described above (#3). In a situation where there is the "door opening/closing command" from the user, the system ECU 1 transmits a command to the door ECU 61 to unlock the door lock (#4), and unlocks the door lock. Further, the system ECU 1 transmits a command to the door ECU 61 to open the door (#5), and opens the door 6. The series of processes indicated by codes #1 to #5, in other words, the processes to automatically open the door 6 in a situation where the opening operation is reserved and the presence of the mobile apparatus 5 is recognized within the predetermined area, corresponds to a second step of the method for controlling the vehicle door to open/close according to the embodiment of the present invention.

On the other hand, in a situation where the system ECU 1 has not recognized the "door opening/closing command", the system ECU 1 waits an unlocking operation of the door lock of the door 6 (#21 and #21a). In a situation where a detection signal is inputted from the unlocking operation detecting portion 31 within a predetermined period of time, the system ECU 1 transmits an unlocking command to the door ECU 61 to unlock the door lock of the door 6 (#22). In a situation where the door lock of the door 6 is unlocked, the system ECU 1 waits an opening operation of the door 6 (#23 and #23a). In a situation where the door handle 2 is operated within a predetermined period of time and a latch (not illustrated) between the vehicle and the door panel 60 disengages, a detection signal by a latch switch (not illustrated) is inputted to the system ECU 1. The system ECU 1 recognizes that the user has operated the door to open, and transmits a command to the door ECU 61 to open the door. Thus, the door 6 is electrically operated to open.

[Locking and closing operation control] Next, "locking and closing operation control" will be explained with reference to flowcharts illustrated in FIGS. 5 and 6. In a situation where the user is present in the vehicle compartment 7, the mobile apparatus 5 carried by the user is present also in the vehicle compartment 7. The vehicle interior driver 72 provided in the vehicle compartment 7 modulates and amplifies a request signal. The vehicle interior transmission antenna 73 provided in the vehicle compartment 7 transmits the request signal. The mobile apparatus 5 receives the request signal. The signal-processing CPU 51 of the mobile apparatus 5 processes the received signal. Then, the transmission system 53 of the mobile apparatus 5 transmits items of return information, such as characteristics of the received signal and a registration code. Electric waves transmitted from the mobile apparatus 5 are received by the tuner 71. The system ECU 1 checks the return information to recognize that the mobile apparatus 5 is present in the vehicle compartment 7. An intention of the user who "wants to automatically lock the door lock and to automatically close the door when the user goes away from the vehicle" is set to the mobile apparatus 5 by the user as a command (closing operation command) before the user get out of the vehicle. A method of commanding is basically similar to a situation of the unlocking and opening operation control described above.

For example, the door opening/closing button 41 is pushed by the user continuously for a predetermined period of time. By this, the signal-processing CPU 51 of the mobile apparatus 5 receives the intention of the user who "wants to automatically lock the door lock and to automatically close the door when the user goes away from the vehicle" as a command. The method of commanding is similar to a situation where the intention of the user who "wants to automatically unlock the door lock and to automatically open the door when the user comes close to the vehicle" is received as a command as described above. In other words, the mobile apparatus 5 simply receives the "door opening/closing command". The system ECU 1 of the vehicle judges (recognizes) which is meant by the command, the "unlocking and opening operation (opening operation command)" or the "locking and closing operation (closing operation command)", corresponding to a state of the door 6. For example, in a situation where the door lock is locked and the door 6 is entirely closed, the system ECU 1 judges the "opening/closing command" as the unlocking and opening operation command, and in a situation where the door lock is unlocked and the door 6 is entirely opened, the system ECU 1 judges the "opening/closing command" as the locking and closing operation command.

In the meantime, if the "unlocking and opening command" is set to the mobile apparatus 5 in a situation where the door opening/closing button 41 and the door unlocking button 42 are simultaneously pushed, and if the "locking and closing command" is set to the mobile apparatus 5 in a situation where the door opening/closing button 41 and the door locking button 43 are simultaneously pushed, judgment need not to be made by the system ECU 1. In either case, the process done by the user to command the mobile apparatus 5 to reserve the opening/closing operation (closing operation) of the door 6 on the basis of the intention of the user corresponds to a first step of a method for controlling a vehicle door to open/close according to the embodiment of the present invention.

Figure 5:
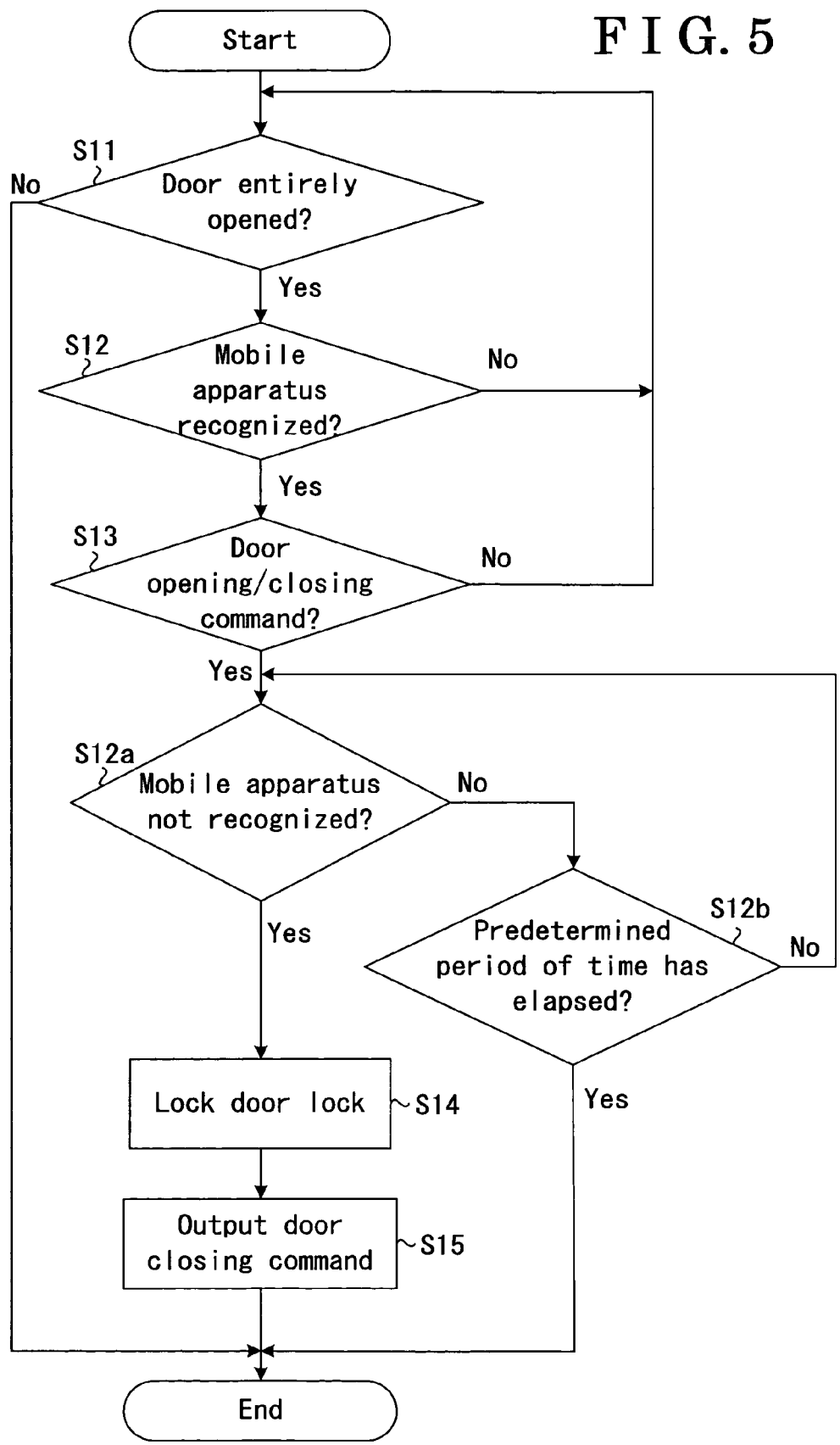
FIG. 5 represents a flowchart illustrating an example (locking and closing operation) of the present invention.
Figure 6:
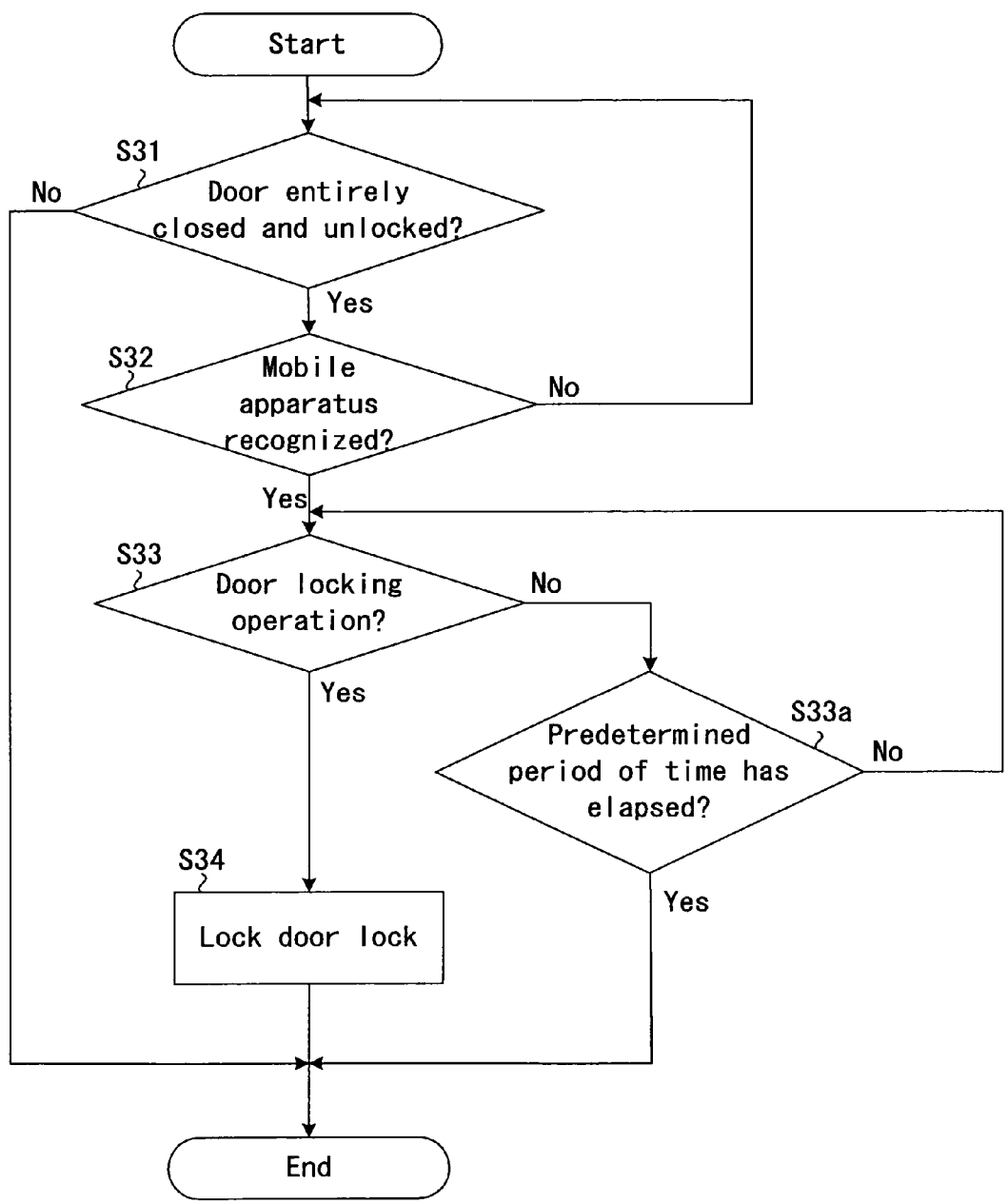
FIG. 6 represents a flowchart illustrating an example of locking a conventional entry system.

As illustrated in a flowchart of FIG. 5, the system ECU 1 checks a state of the door 6 as the system ECU 1 starts the locking and closing operation. In other words, the system ECU 1 checks that the door 6 is entirely opened (#11). In the meantime, in a situation where the door 6 is opened, the door lock is normally unlocked. Accordingly, a state of the door lock need not to be particularly checked. Further, if the door 6 is locked, the locking control is further performed for the locked door lock of the door 6. In this case, the state of the door 6 is not changed. Accordingly, there is no substantial problem.

In a situation where the user gets out of the vehicle with the mobile apparatus 5, the communication between the system ECU 1 and the mobile apparatus 5 through the electric waves transmitted from the vehicle interior transmitting antenna 73 to the mobile apparatus 5 is disrupted, and inversely, a communication between the vehicle exterior driver 9 and the mobile apparatus 5 through electric waves transmitted from the vehicle exterior transmitting antenna 74 to the mobile apparatus 5 is established. By these, the system ECU 1 recognizes that the mobile apparatus 5 has moved from inside the vehicle compartment 7 to outside the vehicle compartment 7 (#12).

As detailed in the explanation of the unlocking and opening operation control, return information transmitted from the mobile apparatus 5 includes the "door opening/closing command (closing command)" set by the user. The system ECU 1 recognizes the "door opening/closing command" by processes similar to that described above (#13). In a situation where there is a "door opening/closing command" from the user, the system ECU 1 waits until the communication with the mobile apparatus 5 is not established either through the vehicle interior transmitting antenna 73 and the vehicle exterior transmitting antenna 74, in other words, until the communication is disrupted. In a situation where the communication with the mobile apparatus 5 is disrupted, the system ECU 1 recognizes that the mobile apparatus 5 is not present within the communication area (within the predetermined area). In other words, the system ECU 1 judges (recognizes) that the user, who is carrying the mobile apparatus 5, has gone away from the vehicle (#12a and #12b). Then, the system ECU 1 transmits a command to the door ECU 61 to lock the door lock. Thus, the door lock is locked (#14). Further, the system ECU 1 transmits a command to the door ECU 61 to close the door 6 (#15). Thus, the door 6 is closed.

In the meantime, sequence of the closing operation and the locking operation can be reversed. In the present embodiment, because the door 6 has a configuration that a locked state can be retained even when the door 6 is closed after the door lock is locked, either sequence can be employed without problems. In a situation of a door, of which a locked state is released when the door closes after the door lock is locked, a closing operation command is transmitted at first, and the door is locked after the door is closed. The series of processes illustrated in FIG. 5, in other words, the processes to automatically close the door 6 in a situation where the closing operation is reserved and the presence of the mobile apparatus 5 is not recognized within the predetermined area, correspond to a second step of the method for controlling the vehicle door to open/close according to the embodiment of the present invention.

In the controls described above, in a situation where the "door opening/closing command (closing operation)" has not been set to the mobile apparatus 5, the system ECU 1 repeats the processes indicated by #11 to #13 to wait. For example, in a situation where the user who gets out of the vehicle and is present near the vehicle sets the "door opening/closing command" at outside the vehicle, the "door opening/closing command" is recognized during the repetition of the processes. Further, in a situation where the user has not set the "door opening/closing command" and the user closes the door 6 by operating the button provided at the vehicle or the mobile apparatus 5 or by a manual operation, the "locking and closing operation" is terminated according to a judgment made in #11. This is because there is no need of an automatic closing operation control. In this situation, for example, conventional locking control of an entry system illustrated in FIG. 6 is performed.

The system ECU 1 checks that the door 6 is entirely closed and the door lock is unlocked (#31). As described above, the mobile apparatus 5 is recognized by the system ECU 1 (#32). The system ECU 1 waits a locking operation by the user after the system ECU 1 checks that the user gets out of the vehicle and the door 6 is closed. In other words, the system ECU 1 waits a detection signal from the locking operation detecting portion 32 (#33 and #33a) for a predetermined period of time. In a situation where the detection signal is inputted from the locking operation detecting portion 32, the system ECU 1 transmits a locking command to the door ECU 61. Thus, the door lock is locked (#34). In a situation where the detection signal is not transmitted from the locking operation detecting portion 32 even when the predetermined time elapses, the system ECU 1 terminates the process.

[Cancel of the opening/closing command] The opening/closing command (opening/closing operation command by the commanding means on the basis of the intention of the user) to the mobile apparatus 5 is performed as described above. On the other hand, if the opening/closing command is always effective after the opening/closing command is set, there can be a situation where the vehicle door is automatically opened/closed even in a situation where there is no need for the door to automatically open/close. As a method for solving this, there is a method for giving a command to the mobile apparatus 5 to cancel the opening/closing command. For one example of a canceling command, the door unlocking button 42 and the door locking button 43 can be simultaneously pushed or the door unlocking button 42 and the door locking button 43 can be simultaneously pushed for a predetermined period of time in order for canceling the set opening/closing command. Of course a reset button for canceling can be separately provided. In the method described above, the user need to definitely set the "opening/closing command" and the "canceling command" in each case. By this method, although the door can be automatically opened/closed many times in a state where the "opening/closing command" is set, unnecessary automatic opening/closing is performed in a situation where the user forgets to set the "canceling command".

On the other hand, there is a method for automatically canceling the "opening/closing command" in a situation where the door 6 has been operated to open/close on the basis of the opening/closing command (opening/closing operation command by the commanding means on the basis of the intention of the user) to the mobile apparatus 5. By this method, for example, the system ECU 1 transmits to the mobile apparatus 5 that the door 6 has been operated to open by the door ECU 61 on the basis of the "opening operation command (opening/closing command)". This is so called the "canceling command". Thus, the mobile apparatus 5 cancels the set "opening/closing command". In a situation where the door 6 has been operated to close by the door ECU 61 on the basis of the "closing operation command (opening/closing command)", the communication between the mobile apparatus 5 and the system ECU 1 is disrupted. The system ECU 1 receives the closing operation command and transmits information that the system ECU 1 has received the closing operation command to the mobile apparatus 5. The mobile apparatus 5 receives the information that the system ECU 1 has received the closing operation command. After that, the mobile apparatus 5 cancels the set "opening/closing command" on the basis of the disruption of the communication as the "canceling command".

According to this method, because the door is returned to a normal control state after the door opens/closes on the basis of the "opening/closing command" by the user, a situation, where the door is opened/closed against the intention of the user, can be prevented. On the other hand, it is not possible to automatically open/close the door continuously and many times. However, normally, it can be assumed that situations, where the user wants to automatically open/close the door because the both hands of the user are unavailable, are not so continuously occur. Further, if such situations continue, a command can be simply given by the method described above again. Accordingly, there is no problem even if an effect, in which the door is not opened/closed against the intention of the user, is prioritized. According to this method, the user, who is carrying the mobile apparatus 5, can preliminarily set the mobile apparatus 5 on the basis of the intention to open/close the door as the user comes close to or goes away from the vehicle in each case. In other words, the intention of the user can be preferably reflected to the opening/closing control.

Further, another method, in which the number of the "opening/closing commands" to perform can be set, can be employed. In other words, various kinds of methods for canceling the "opening/closing command" are possible. There are many options when the "opening/closing command" is canceled and how to cancel the "opening/closing command". Such various kinds of methods fall within the scope of the present invention at the point that the "opening/closing command" and the "canceling command" are set to the mobile apparatus 5. Further, in the explanation of the embodiment described above, the door 6 was explained to be entirely closed or entirely opened. However, a state of the door 6 can be appropriately changed, of course. Even if such a change is made, the embodiment of the present invention does not deviate from the scope of the present invention. Further, in the explanation of the embodiment described above, the communication between the mobile apparatus 5 and the vehicle side (for example, the system ECU 1) was explained using an example in which the mobile apparatus 5 performs different communications inside the vehicle compartment 7 and outside the vehicle compartment 7. However, the embodiment of the present invention is not limited to this configuration. For example, a configuration, in which the communication is performed only outside the vehicle compartment 7, is possible. Persons skilled in the art may be able to appropriately change the communication system. However, such a change does not deviate from the scope of the present invention.

[Vehicle equipment driving apparatus] As described above, the embodiment of the vehicle door opening/closing apparatus and the method for controlling the vehicle door to open/close, in which the vehicle door can be automatically opened/closed corresponding to the intention of the user without an operation of the operating portion provided at the vehicle or the operating portion of the mobile apparatus for remote control in each case, was explained. However, the embodiment of the present invention is not limited to this. The embodiment of the present invention can be applied to a vehicle equipment driving apparatus for driving various kinds of vehicle equipment and a control method for driving the vehicle equipment.

Recently, a system for showing various greeting effects, when a user who comes close to a vehicle is detected, is suggested. For example, a system for indicating a place of the vehicle by the lighting system, which is turned on or which is blinking when the user comes close, is suggested. Another system for informing the user that the user comes close to the vehicle by voice and sound is also suggested. Further, a system, which starts engine and air conditioning, is also suggested. However, there are situations where there is no need of the lighting system to be turned on and to be blinking during daylight and where voice and sound may disturb or annoy others. Further, start of an engine and start of air conditioning is not always necessary.

A vehicle equipment driving apparatus for driving such various kinds of vehicle equipment can be configured as described below. For driving the vehicle equipment, the user can set a driving intention to a mobile terminal as a driving command. Then, a vehicle terminal receives the driving intention of the user through a communication with the mobile terminal. The vehicle equipment driving means drives the vehicle equipment on the basis of the driving command corresponding to the intention of the user. The mobile apparatus 5 according to the embodiment of the vehicle door opening/closing apparatus is one example of the mobile terminal. The system ECU 1 is one example of the vehicle terminal. The door ECU 61 is one example of a vehicle equipment driving means. Further, a communication method and a flow of controlling are similar to those of the embodiment of the vehicle door opening/closing apparatus. In the meantime, the mobile terminal is not limited to a vehicle key such as the mobile apparatus 5. The mobile terminal can include a liquid crystal displaying portion and a character inputting portion, or the like.

In a situation where a drive condition of the vehicle equipment is preliminarily set, the drive condition cannot be flexibly changed corresponding to the intention of the user which changes according to circumstances. However, in a situation where the mobile terminal carried by the user is utilized, the intention of the user can be given to the mobile terminal as a command at a position distant from the vehicle. As a result, a vehicle equipment controlling apparatus, which can automatically drive vehicle equipment corresponding to the intention of the user, can be provided.

According to a first aspect of the present invention, a vehicle door opening/closing apparatus includes a mobile apparatus carried by a vehicle user, a recognizing means for recognizing a presence of the mobile apparatus within a predetermined area relative to a vehicle, a commanding means provided at the mobile apparatus for commanding an opening/closing operation of a vehicle door on the basis of an intention of the vehicle user even in a situation where the mobile apparatus is out of the predetermined area of the recognizing means and a controlling means for controlling the vehicle door to open/close on the basis of a recognition of the recognizing means and the opening/closing operation command of the commanding means. The controlling means operates the vehicle door to open at the time when the recognizing means recognizes that the mobile apparatus is within the predetermined area and in a situation where the commanding means has commanded to operate the vehicle door to open on the basis of the intention of the vehicle user. The controlling means operates the vehicle door to close at the time when the recognizing means recognizes that the mobile apparatus is out of the predetermined area and in a situation where the commanding means has commanded to operate the vehicle door to close on the basis of the intention of the vehicle user.

According to the first aspect, in a situation where the mobile apparatus, to which the opening operation of the vehicle door has been commanded by the vehicle user on the basis of the intention of the user, comes close to the vehicle door, the vehicle door is operated to open without an operation by the vehicle user near the vehicle. Further, in a situation where the mobile apparatus, to which the closing operation of the vehicle door has been commanded by the vehicle user on the basis of the intention of the vehicle user, goes away from the vehicle, the vehicle door is operated to close without an operation by the vehicle user. Accordingly, in a situation where, for example, both hands of the vehicle user are unavailable, and the user cannot operate the operating portion provided at the vehicle or the operating portion of the mobile apparatus for remote control each time the user intends to open/close the vehicle door, the vehicle door can be automatically opened/closed corresponding to the intention of the vehicle user. In the meantime, the recognizing means and the controlling means have physical configurations of course. The time when the recognizing means recognizes the presence of the mobile apparatus within the predetermined area includes a time difference caused by process time and communication time, or the like, caused by the physical configuration of course.

According to a second aspect of the present invention, the mobile apparatus cancels the opening/closing operation command every time when the vehicle door has been opened/closed on the basis of the opening/closing operation command to the vehicle door from the commanding means on the basis of the intention of the vehicle user.

In a situation where the opening/closing operation command is always effective after the vehicle user commands the opening/closing operation, there can be a situation where the vehicle door is automatically opened/closed even in a situation where automatic opening/closing is not necessary. However, according to the second aspect, in a situation where the vehicle door has been opened/closed on the basis of the opening/closing operation command of the vehicle door by the commanding means on the basis of the intention of the vehicle user, if the opening/closing operation command is canceled, a situation where the vehicle door is opened/closed against the intention of the vehicle user can be prevented. The vehicle user who carries the mobile apparatus can give the opening/closing operation command on the basis of the intention of the vehicle user and convenience for the vehicle user in each case. Accordingly, the intention of the vehicle user can be preferably reflected to the opening/closing operation.

According to a third aspect of the present invention, the controlling means further controls a locking/unlocking operation of a vehicle door locking device whereby the controlling means unlocks and opens or locks and closes the vehicle door on the basis of recognized results of the recognizing means.

In a situation where the vehicle is parked in a parking space, or the like, the vehicle door is in a closed state, and in many cases, the vehicle door is locked. Further, in a situation where the vehicle user gets out of the vehicle and goes away from the vehicle in the parking space, or the like, the vehicle door is normally locked. Accordingly, in a situation where the vehicle user gets on the parked vehicle, in many cases, the vehicle door need to be unlocked and opened. And in a situation where the vehicle user gets out of the vehicle and goes away from the vehicle, the vehicle door need to be locked and closed. According to the third aspect of the present invention, the vehicle door controlling means performs the opening/closing operation control and the unlocking/locking control corresponding to the opening/closing operation command of the vehicle user on the basis of the intention of the vehicle user. Accordingly, more convenient opening/closing control can be performed corresponding to the intention of the vehicle user.

According to a fourth aspect of the present invention, the commanding means is provided in a remote control portion of the mobile apparatus for remotely controlling the vehicle door to unlock/lock or open/close the vehicle door.

In a situation where the aspect of the present invention is carried out, an independent operating portion can be provided at the mobile apparatus as the commanding means. However, in many cases, the remote control portion for remotely controlling the vehicle door to lock/unlock or open/close is provided in such a mobile apparatus. Accordingly, in a situation where the existing remote control portion is commonly utilized, new function obtainable from the aspect can be obtained from minimum change of design, for example, for software installed in the mobile apparatus. Further, because the number of the operating portion does not increase, convenience for the vehicle user is not reduced.

According to a fifth aspect of the present invention, a method for controlling a vehicle door to open/close in cooperation with a mobile apparatus carried by a vehicle user includes a first step for preliminarily commanding the mobile apparatus to operate the vehicle door to open/close on the basis of an intention of the vehicle user and a second step for automatically operating the vehicle door to open at the time when the recognizing means recognizes a presence of the mobile apparatus within a predetermined area relative to a vehicle and in a situation where the mobile apparatus has been preliminarily commanded to operate the vehicle door to open in the first step, and for automatically operating the vehicle door to close at the time when the recognizing means recognizes a non-presence of the mobile apparatus within the predetermined area and in a situation where the mobile apparatus has been preliminarily commanded to operate the vehicle door to close in the first step.

The method for controlling the vehicle door to open/close according to the aspect can have all actions/effects regarding the vehicle door opening/closing apparatus described above, and can have all additional aspects and actions/effects obtainable therefrom.

The principles, preferred embodiment and mode of operation of the present invention, have been described in the foregoing specification. However, the invention that is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A vehicle door opening/closing apparatus, comprising:
   a mobile apparatus carried by a vehicle user and adapted to be operated by the vehicle user to effect opening/closing operation of the vehicle door;
   recognizing means for recognizing a presence of the mobile apparatus within a predetermined area relative to a vehicle;
   commanding means provided at the mobile apparatus for commanding an opening/closing operation of a vehicle door on the basis of the operation of the mobile apparatus by the vehicle user;
   a motor connected to the vehicle door to move the vehicle door from a closed position to an open position and from the open position to the closed position; and
   controlling means for controlling the motor to open/close the vehicle door on the basis of a recognition of the recognizing means and the open/close operation command of the commanding means, the controlling means initiating operation of the motor to begin closing the vehicle door at the time when, following the vehicle user's operation of the mobile apparatus while the mobile apparatus is located in the predetermined area, the recognizing means recognizes that the mobile apparatus is no longer located inside the predetermined area.

2. The vehicle door opening/closing apparatus according to claim 1, wherein the mobile apparatus cancels the opening/closing operation command after the vehicle door has been opened/closed on the basis of the opening/closing operation command to the vehicle door from the commanding means.

3. The vehicle door opening/closing apparatus according to claim 1, wherein the controlling means further controls a locking/unlocking operation of a vehicle door locking device whereby the controlling means unlocks the vehicle door locking device and operates the motor to open the vehicle door, or locks the vehicle door locking device and operates the motor to close the vehicle door on the basis of recognized results of the recognizing means.

4. The vehicle door opening/closing apparatus according to claim 2, wherein the controlling means further controls a locking/unlocking operation of a vehicle door locking device whereby the controlling means unlocks the vehicle door locking device and operates the motor to open the vehicle door, or locks the vehicle door locking device and operates the motor to close the vehicle door on the basis of recognized results of the recognizing means.

5. The vehicle door opening/closing apparatus according to claim 1, wherein the commanding means is provided in a remote control portion of the mobile apparatus for remotely controlling the vehicle door to unlock/lock or open/close the vehicle door.

6. The vehicle door opening/closing apparatus according to claim 2, wherein the commanding means is provided in a remote control portion of the mobile apparatus for remotely controlling the vehicle door to unlock/lock or open/close the vehicle door.

7. The vehicle door opening/closing apparatus according to claim 3, wherein the commanding means is provided in a remote control portion of the mobile apparatus for remotely controlling the vehicle door to unlock/lock or open/close the vehicle door.

8. The vehicle door opening/closing apparatus according to claim 4, wherein the commanding means is provided in a remote control portion of the mobile apparatus for remotely controlling the vehicle door to unlock/lock or open/close the vehicle door.

9. A method for controlling an open vehicle door to close in cooperation with a mobile apparatus carried by a vehicle user, comprising:
    commanding a closing operation of the open vehicle door while the mobile apparatus is within a predetermined area;
    recognizing that the mobile apparatus is no longer in the predetermined area; and
    initiating closing of the open vehicle door based on the closing operation command only after recognizing that the mobile apparatus is no longer in the predetermined area.

10. The method according to claim 9, wherein the commanding of the closing operation of the open vehicle door comprises the vehicle user pushing a button on the mobile apparatus.

11. The method according to claim 9, wherein the initiating closing of the open vehicle door includes operating a motor to move the vehicle door from an open position toward a closed position.

12. The method according to claim 11, further comprising locking the vehicle door.

13. The method according to claim 9, wherein the recognizing that the mobile apparatus is no longer in the predetermined area comprises recognizing communication between the mobile apparatus and the recognizing means, and subsequently recognizing that the communication between the mobile apparatus and the recognizing means is disrupted.

14. The method according to claim 9, wherein the commanding of the closing operation of the open vehicle door comprises the vehicle user operating the mobile apparatus.

* * * * *